United States Patent [19]
Anderson

[11] Patent Number: 6,047,091
[45] Date of Patent: Apr. 4, 2000

[54] LOW LATENCY ARCHITECTURE FOR SPATIAL FILTRATION

[75] Inventor: Mark A. Anderson, Ft. Collins, Colo.

[73] Assignee: Hewlett-Packard Company, Palo Alto, Calif.

[21] Appl. No.: 09/053,278

[22] Filed: Apr. 1, 1998

[51] Int. Cl.[7] .............................. G06T 5/00; G06K 9/40
[52] U.S. Cl. .......................................... 382/260; 382/304
[58] Field of Search .................................... 382/199, 260, 382/263, 266, 269, 274, 275, 304, 307; 358/473; 250/208.6; 345/166

[56] References Cited

U.S. PATENT DOCUMENTS

| | | | |
|---|---|---|---|
| 3,964,021 | 6/1976 | Tamches | 382/304 |
| 4,799,055 | 1/1989 | Nestler et al. | 345/166 |
| 4,885,787 | 12/1989 | Okamoto et al. | 382/260 |
| 5,027,423 | 6/1991 | Kawata et al. | 382/307 |
| 5,912,744 | 6/1999 | Nakane | 382/263 |

*Primary Examiner*—Scott Rogers

[57] ABSTRACT

A spatial filter having coefficients selected and distributed within an array, so that when the array is divided non-diagonally into four equal quadrants, (1) the coefficients are of constant sign within each quadrant; (2) coefficients in diagonally opposed quadrants have like sign; and (3) coefficients in non-diagonally neighboring quadrants have unlike sign. In a preferred embodiment, coefficients cause the array to form a "saddle" shape when the coefficient values are representative of the local slope on a surface described by the array. This "saddle" shape enables improved filtration properties. The inventive spatial filter is further advantageously embodied in architecture comprising an array of individual calculation modules corresponding to the filter array. Rows of modules are coupled together in parallel. The input signal is fed to each row concurrently via FIFO buffers, enabling concurrent calculation operations. After calculation, output values for each module are accumulated and summed, the result being placed into an output stream. The FIFO buffers then present the next input values in the input stream to the calculation modules, and so on. The result is a low-latency "streaming" filtration that is further economical on hardware, requiring only FIFO storage resources. Advantageously, the entire inventive filter may be conveniently deployed as a digital signal processor ("DSP") on a unitary integrated circuit chip.

12 Claims, 4 Drawing Sheets

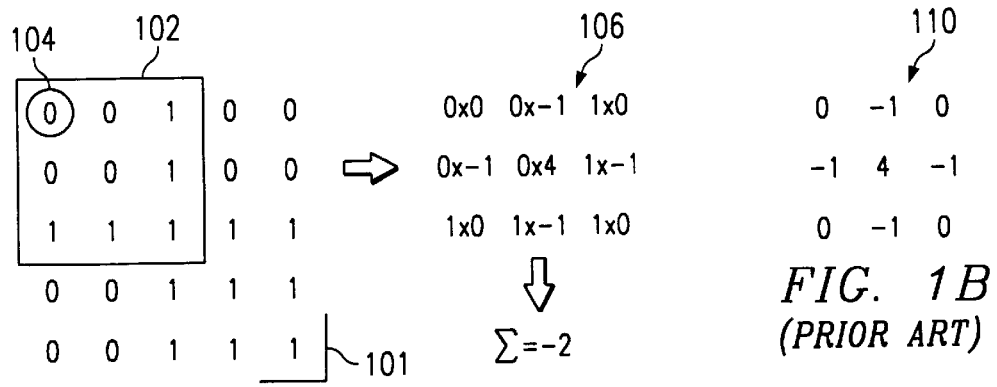
FIG. 1B
(PRIOR ART)
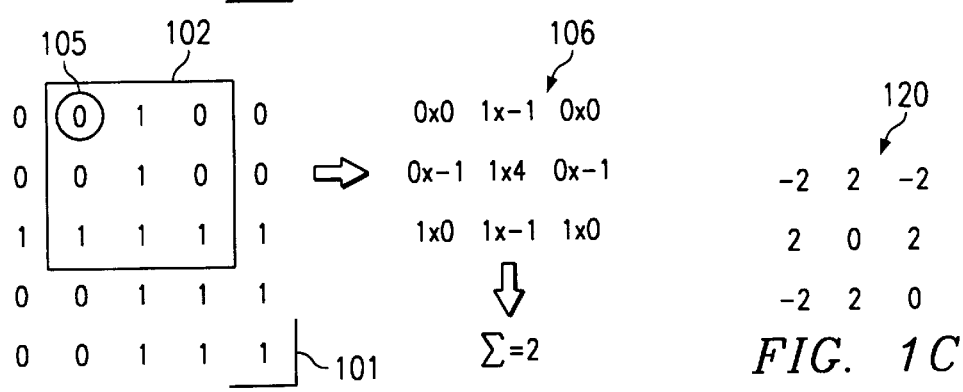
FIG. 1C
FIG. 1A
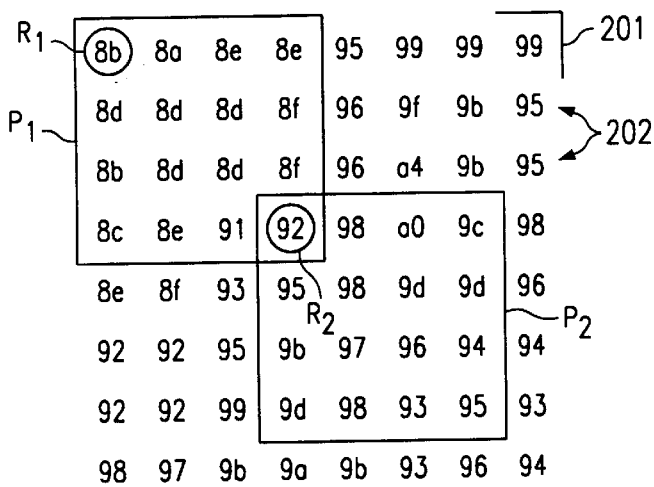
FIG. 2A
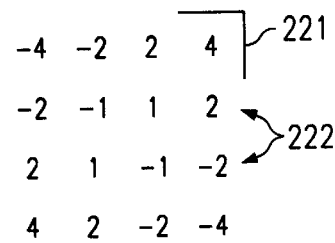
FIG. 2B
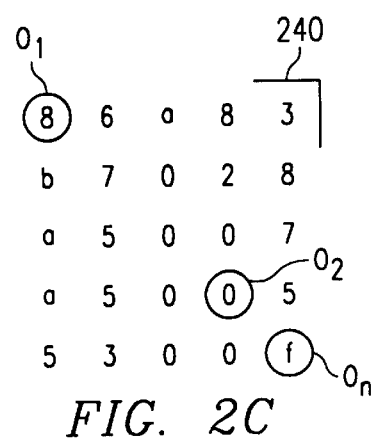
FIG. 2C

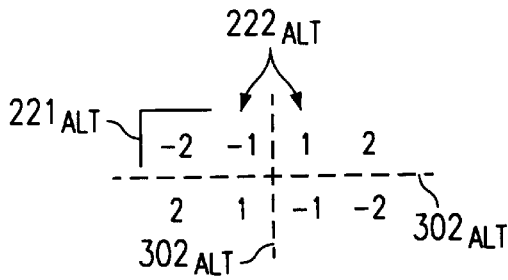

LOW LATENCY ARCHITECTURE FOR SPATIAL FILTRATION

RELATED APPLICATION

This application is related to co-pending, commonly assigned U.S. patent application entitled "SPATIAL FILTER FOR SURFACE TEXTURE NAVIGATION," Ser. No. 09/053,294, filed concurrently herewith, the disclosure of which application is incorporated herein by reference.

TECHNICAL FIELD OF THE INVENTION

This invention relates generally to spatial filtering of pixelated images in the digital domain, and more specifically to architecture enabling low-latency spatial filtration of an image via concurrent execution of calculations in a "streaming" fashion.

BACKGROUND OF THE INVENTION

Devices having a tracking capability (such as a hand-held scanner) require navigation functionality in order to maintain awareness of the device's present position on a piece of work. The surface texture of the work can provide a frame of reference for navigation. A known effective technique for enabling such navigation is to shine light at an angle on the work, and to process the resulting reflection, which will include the surface texture shadow of the work. This technique enables navigation using, for example, the fiber texture on the surface of a piece of paper from which an image is being scanned.

Part of such a navigation technique is to filter an input signal representative of the resulting reflected image through a spatial filter (also often called a "DC removal filter" or a "DCR filter"). The spatial filter is used to enhance the high optical frequencies within the image so as to correspondingly sharpen edges within the image and to differentiate more clearly between regions of similar contrast.

In the digital domain, a digital input signal for a spatial filter typically comprises a stream of pixel values which, when organized into an array, correspond to pixels of the input image as seen by an array of photosensitive cells. The values in the input stream are representative of a color shade seen by the corresponding cells looking at the input image in pixelated form.

The filter itself is an array of filter coefficients. The values of the coefficients and their distribution within the array influence the filtration properties of the filter. To enable filtration, pixel values in the input stream are first organized into an input array. The filter array is then overlaid on "patches" of the input array, each patch indexed to a reference pixel for which the overlay is made. The coefficients are multiplied by the corresponding input values in the patch, and the sum of those products is an output value, or "filtered" value for the referenced pixel. Successive filtered values form a filtered output stream for the image.

This process is illustrated on FIGS. 1A, 1B, and 1C with reference to an exemplary filter array 110 standard in the art shown on FIG. 1B. Looking at FIG. 1A, input array 101 has filter array 110 (from FIG. 1B) overlaid as patch 102 successively indexed to first and second reference pixels 104 and 105. A series of multiplications 106 for each patch overlay is performed, the sum of these products being places in an output array 120 as shown on FIG. 1C.

As noted, the numeric value and the distribution of filtration coefficients within a filter array is highly influential on the properties of the filter. The filter array 110 in FIG. 1B is commonly known as a "highpass" filter, and is typical of filters standard in the art. While functional, such high pass filters leave room for improvement in several areas key to effective spatial filtration.

First, contrast and edge enhancement should be as "strident" as possible. While effective for sharp edges, prior art filters such as in FIG. 1B do not detect gradual changes in color shades well. When processing reflections off surface textures such as, for example, paper fiber, gradual shade changes should be expected to be encountered.

Second, the dynamic range of output values should be kept to a minimum to conserve storage processing resources. The numeric values of coefficients should be selected and distributed so that the sums of their products, patch by patch, are generally smaller numbers than the corresponding input values in the patch. This type of inherent compression is not always available in prior art filters.

Third, the objective of compressing output values notwithstanding, it is desirable to maximize the size of filter arrays to optimize signal to noise differentiation. It is well known that in digital processing, random noise decreases with an increase in the square root of the number of samples. The filter of FIG. 1B has only nine elements, four of which are zero. Thus, only five elements, or samples, are effective in optimizing the output signal's discernability over random noise.

Fourth, it is desirable for rows and/or columns in a filter array to "zero-balance" (i.e. for the numeric sum of their values to equal zero). This feature addresses a problem of offset injection in the input signal in systems with multiple paths to the filter. This offset is cancelled in a "zero-balanced" filter because the total value passed through the filter is zero on a per row or per column basis.

There is therefore a need in the art for a spatial filter that addresses these considerations.

There is a further need in the art to process input signals through a low latency spatial filter operating in a "streaming" fashion. Filters of the current art typically store an entire frame of input pixel values in a first memory region, and then, on a patch-by-patch basis, sequentially process all the coefficient multiplication operations. The products are then summed and stored in a second memory region. When all patches are completed, the output as stored in the second memory region is presented to the downstream hardware.

This type of batch processing causes slowdowns that could be remediated by more of a continuous and parallel processing of the input stream via, for example, FIFO buffers instead of first and second memory regions. Concurrent multiplication operations would also speed up processing.

SUMMARY OF THE INVENTION

These and other objects, features and technical advantages are achieved by a spatial filter in which coefficients are selected to have a numerical value and distribution so as to improve performance in key areas such as contrast enhancement, dynamic range compression, signal to noise discernability and offset cancellation. The inventive spatial filter is further advantageously embodied on architecture enabling the desired "streaming" processing.

According to the present invention, a spatial filter is provided wherein coefficients are selected and distributed within a filter array so that when the filter array is divided non-diagonally into four equal quadrants, (1) the coefficients are of constant sign within each quadrant; (2) coefficients in diagonally opposed quadrants have like sign; and (3) coefficients in non-diagonally neighboring quadrants have unlike sign.

In a preferred embodiment, coefficients selected and distributed as set forth above within the filter array are arranged within the array to form a "saddle" shape when the coefficient values are representative of the local slope on a surface described by the filter array. Examples of spatial filters with coefficients according to the invention are shown on FIGS. 3A through 3G and are described in more detail below.

This "saddle" shape exhibited by a preferred embodiment of the inventive spatial filter enables the filter to display improved characteristics. First, the inventive spatial filter provides excellent contrast differentiation and edge detection in images where there is a gradual change in shade rather than a sharp edge. Second, dynamic range compression is enabled, since input values to the exemplary inventive filters shown on FIGS. 3A through 3G will generally be 8 bits wide, while output (filtered) results will only be 4 bits wide. The inventive spatial filter further shows improved signal to noise properties, having 16 non-zero elements in the filter of FIG. 3A, for example, as opposed to only 5 in the current art filter of FIG. 1B. Finally, the coefficients of the inventive spatial filter are zero-balanced in all rows and columns, enabling cancellation of any offset injected into an input signal fed along multiple paths to architecture embodying the filter.

The inventive spatial filter is further advantageously embodied in architecture comprising an array of individual calculation modules each corresponding to a coefficient value in the filter array. Each module stores its corresponding coefficient value. Rows of modules are coupled together in parallel, the modules in each row coupled in series. Columns of modules are isolated. The input signal is fed to each row concurrently via FIFO buffers, enabling all calculation modules to operate concurrently. After calculation, output values for each module are accumulated and summed, the result placed into an output stream being fed to downstream hardware. The FIFO buffers then present the next input values in the input stream to the calculation modules, and so on. The result is a low-latency "streaming" filtration that is further economical on hardware, requiring only FIFO storage resources instead of dedicated memory. This hardware economy in turn enables the inventive filter, when embodied on the architecture described above, to be deployed conveniently as a digital signal processor ("DSP") on an integrated circuit chip.

It is therefore a technical advantage of the present invention to provide a spatial filter whose coefficients are selected and distributed to provide the desirable edge and contrast recognition, dynamic range compression, signal to noise discernability and offset cancellation performance described above.

It is a further technical advantage of the present invention to embody a spatial filter in architecture permitting simultaneous and continuous calculation of output values in a "streaming" process. Such architecture in turn enables the inventive filter to be deployed conveniently as a DSP on an integrated circuit chip.

It is a yet further technical advantage of the present invention to embody a spatial filter in architecture whose "streaming" functionality reduces the memory storage requirements of the filtration process. Such architecture in turn enables the inventive filter to be deployed conveniently as a DSP on an integrated circuit chip.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1A illustrates an input array 101 being filtered by a filter array of the current art;

FIG. 1B depicts the coefficients of the filter array 110 of the current art used in FIG. 1A;

FIG. 1C illustrates an array of output values 120 derived when the input array 101 of FIG. 1A is filtered by the filter array 110 of FIG. 1B;

FIG. 2A illustrates an input array 201 being filtered by an exemplary inventive filter;

FIG. 2B depicts the coefficients 222 of the exemplary inventive filter 221 being used in FIG. 2A;

FIG. 2C illustrates an array of output values $O_1$–$O_n$, derived when the input array 201 of FIG. 2A is filtered by the filter array 221 of FIG. 2B;

FIGS. 3A, 3B, 3C, 3D, 3E, 3F and 3G are alternative examples of filter arrays whose coefficients are selected and distributed according to present invention;

DETAILED DESCRIPTION OF THE INVENTION

Figure 4:
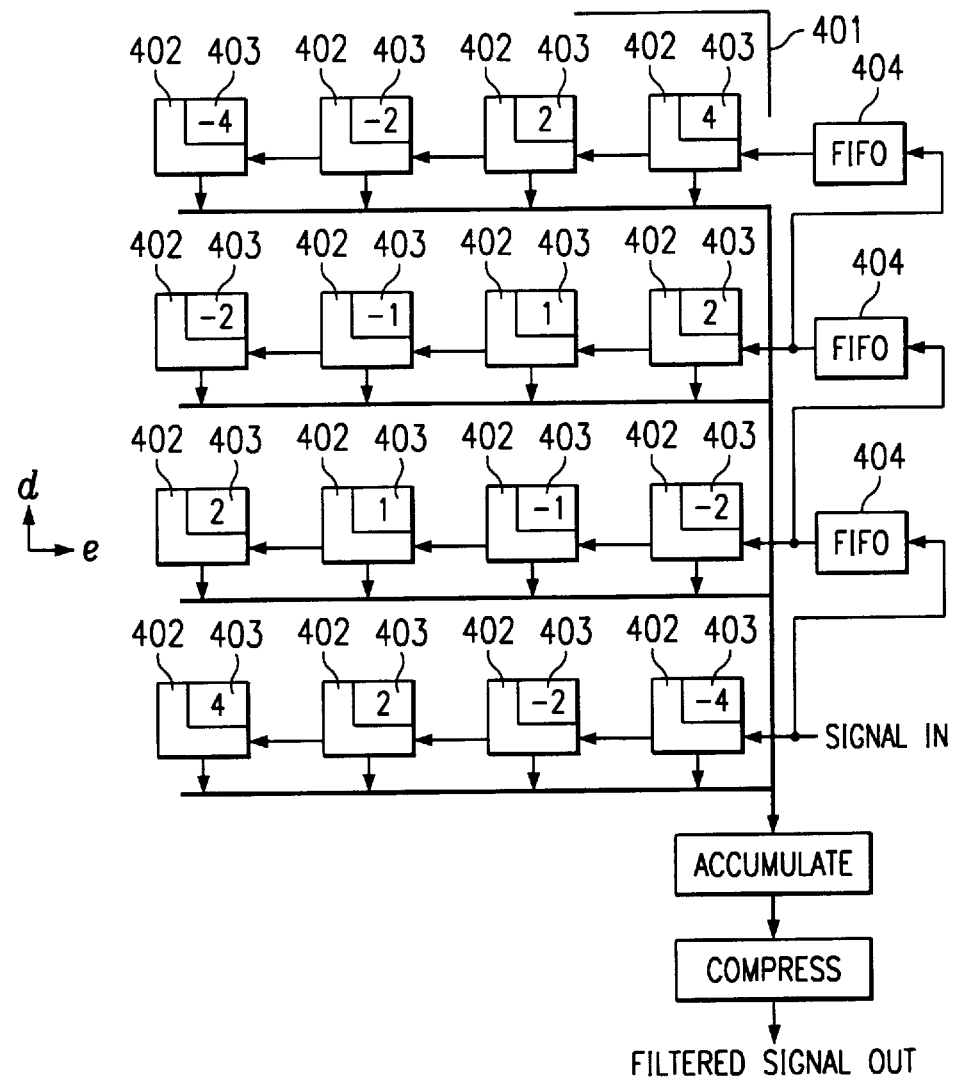
FIG. 4 depicts exemplary architecture in block diagram form on which the inventive filter may be embodied to process an input signal in a low-latency "streaming" environment.

FIG. 2A depicts an exemplary 8×8 input array 201 of pixel values 202 each representative of a color shade of a corresponding pixel in an input image (not illustrated). It is assumed that the input image has already been pixelated and those pixels have been digitized to generate pixel values 202. It will be see in the example of FIG. 2A that pixel values 202 are represented for the convenience of illustration in hex form, although the invention is independent of any such manner of representation.

FIG. 2B depicts an exemplary 4×4 filter array 221 according to the present invention, in which filtration coefficients 222 are for multiplication with corresponding pixel values 202 when, as illustrated on FIG. 2A, filter array 221 is overlaid on input array 201 relative to a selected reference pixel value $R_1$ or $R_2$. It will be appreciated by comparison of FIGS. 2A and 2B that in order for the invention to be enabling, the size of filter array 221 must not be larger than input array 201 in any dimension, and also smaller in at least one dimension than input array 201. Within this constraint, however, the invention is not limited to any particular selection of sizes or number of dimensions of input array 201 or filter array 221.

Referring again to FIG. 2B, and now with further reference to FIG. 3A, it will be seen that coefficients 222 are selected and distributed within filter array 221 so that when filter array 221 is divided into four equal non-diagonal quadrants (such divisions labelled as item 302 on FIG. 3A), three features of the selection and distribution of coefficients 222 emerge: first, coefficients 222 are of constant sign within each quadrant; second, coefficients 222 in diagonally opposing quadrants have like sign; and third, coefficients in non-diagonally neighboring quadrants have unlike sign.

In a preferred embodiment, coefficients 222 selected and distributed within filter array 221 in this fashion are arranged within filter array 201 to form a saddle shape when said coefficients are representative of the local slope on a surface described by filter array 221.

Returning now to FIGS. 2A and 2B, it will be seen on FIG. 2A that filter array 221 has been overlaid as patches $P_1$ and $P_2$ on input array 201 relative to exemplary reference pixel values $R_1$ and $R_2$. With reference now to FIG. 2C, output values $O_1$ and $O_2$ have been calculated for $R_1$ and $R_2$ respectively, those output values $O_1$ and $O_2$ being the numeric sum of the multiplications of coefficients 222 and corresponding pixel values 202 within patches $P_1$ and $P_2$ when filter array 221 was overlaid on input array 201 relative to $R_1$ and $R_2$ respectively. FIG. 2C will in fact be seen to be an output array 240 of output values $O_1$ through $O_n$ derived from an indexed application of filter array 221 to input array 201 on FIG. 2A for a series of corresponding reference pixel values $R_1$ through $R_n$. Again, for the convenience of illustration it will be seen that the output values $O_1$ through $O_n$ are represented on FIG. 2C in hex form, while the values of coefficients 222 on FIG. 2B are represented for convenience in 10-base form.

Although not illustrated, it will be appreciated that output values $O_1$ through $O_n$ may be transformed into an output signal from which a filtered output image can be generated.

A preferred embodiment has been described so far in reference to a filter array 221 as illustrated on FIGS. 2B and 3A. It will be appreciated, however, that the present invention is not limited to the coefficients 222 selected and distributed as shown in FIGS. 2B and 3A, and other selections and distributions are possible with equivalent enabling effect. For example, FIGS. 3B through 3E depict alternative filter arrays $221_{ALT}$ whose coefficients $222_{ALT}$ meet the selection and distribution criteria of the invention. While these and other filter arrays all fall within the scope of the invention, certain advantages may be gained from using one filter array in preference to another. For instance, the filter array of FIGS. 2B/3A has high gain in its contrast enhancement. Therefore, its ability to "extract" an image from soft edges is superior. On the other hand, although the filter array of FIG. 3B does not extract an image quite so well, it displays superior signal to noise improvement. In fact, the use of the values of "1" or "−1" as a coefficient throughout this filter array maximizes signal to noise differential. The filter array of FIG. 3C is extremely economical on hardware through widespread use of the value "0" as a coefficient. The filter array of FIG. 3D compromises the advantages of the arrays of FIGS. 3A through 3C by enabling hardware economy through use of zero values, as well as good contrast enhancement in a selected navigational direction ("East-West" in the exemplary array of FIG. 3D). Other examples of filter arrays enabling the inventive filter are depicted on FIGS. 3F and 3G.

It will also be appreciated that the inventive filter is not limited to a filter array having equal dimensions. FIG. 3E illustrates alternative filter array $221_{ALT}$ having non-equal dimensions. Note that the selection and distribution of coefficients $222_{ALT}$ in FIG. 3E still meet the three criteria described above with reference to FIGS. 2B/3A, namely that when filter array $221_{ALT}$ in FIG. 3E is divided into four equal non-diagonal quadrants (divided via lines $302_{ALT}$), (1) coefficients $222_{ALT}$ are of constant sign within each quadrant, (2) coefficients $222_{ALT}$ in diagonally opposing quadrants have like sign, and (3) coefficients $222_{ALT}$ in non-diagonally neighboring quadrants have unlike sign. The filter array of FIG. 3E has all the advantages of the array of FIG. 3D (hardware economy combined with good contrast enhancement in a selected direction) with the additional feature that hardware economy is yet further enhanced in the array of FIG. 3E by eliminating two rows of coefficients.

A primary advantageous aspect of all embodiments of the inventive spatial filter, however, is that the coefficients are numerically balanced while still enabling the desired edge and contrast enhancement of the input image. Diagonally opposing quadrants have like sign, while neighboring quadrants have unlike sign. Rows and columns of coefficient values advantageously total zero. The array is often (but not always) a "mirror image" along both diagonal bisections. This balance allows the inventive spatial filter to display excellent offset cancellation properties. In a system such as illustrated in FIGS. 4 and 5 (described in more detail below) where there are multiple paths from the input array to the filter, any offset between paths will be cancelled because the output value on a per row or column basis is zero.

A further advantage of the present invention is that it can be embodied in chip architecture (advantageously according to the complementary metal-oxide silicon, or "CMOS" process) so that filtering of an image can be done entirely on-chip in the digital domain in a "streaming" fashion. FIG. 4 depicts exemplary chip architecture in block diagram form for applying an array of spatial filter coefficients (such as illustrated in FIGS. 2B and 3A) to a digital input signal. In FIG. 4, an array 401 of coefficient calculation modules 402 corresponds to an array of filter coefficients such as depicted in FIGS. 2B/3A, 3B and 3C. The illustration in FIG. 4 makes exemplary use of the array 221 in FIG. 2B, and so each coefficient calculation module 402 stores a corresponding multiplicand 403 numerically equal to the corresponding coefficient 222 on FIG. 2B.

Figure 5:
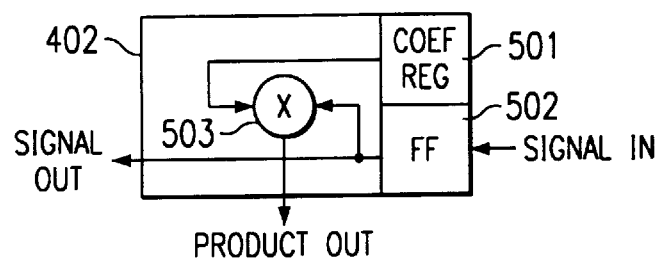
FIG. 5 depicts calculation modules 402 on FIG. 4 in more detail.

FIG. 5 depicts the functional operation of each module 402. Storage 501 holds multiplicand 403. In a preferred embodiment, multiplicand 403 is held as a "hard-coded" fixed value. There is no reason, however, consistent with the present invention, that multiplicand 403 may not be selectively programmable into storage 501. Input values arrive in an input signal and are fed through module 402 via flip-flop gate 502. Multiplier 503 obtains the product of input values times multiplicand 403 and outputs the products from module 402.

Returning now to FIG. 4, it will be seen that if modules 402 are considered to be an dxe array representative of a corresponding filter array, modules 402 are topologically coupled together in series in the d dimension and are isolated in the e dimension. It will be further seen that the input signal is concurrently fed in parallel to each series of modules 402 in the d dimension using FIFO buffers 404 to ensure that modules 402 concurrently process input values in the same patch. FIG. 4 also shows that the outputs of modules 402 are multiplexed, accumulated and compressed to form a combined output signal.

Figure 6A:
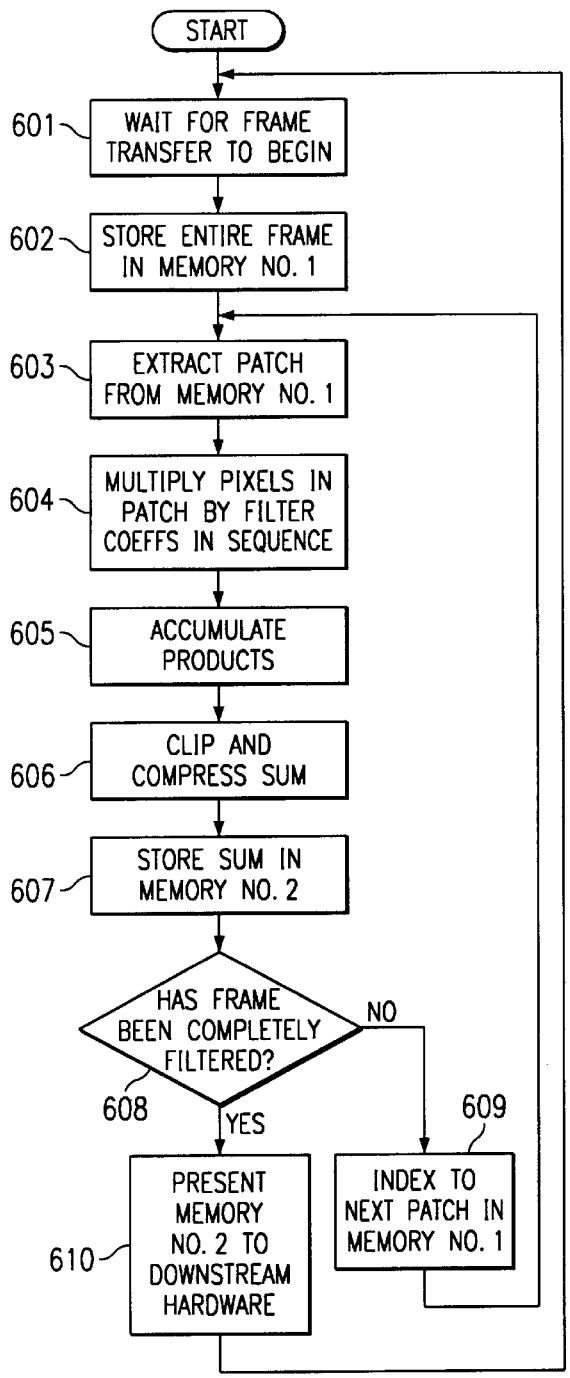
FIG. 6A is a flow chart describing batch filtration of the prior art.
Figure 6B:
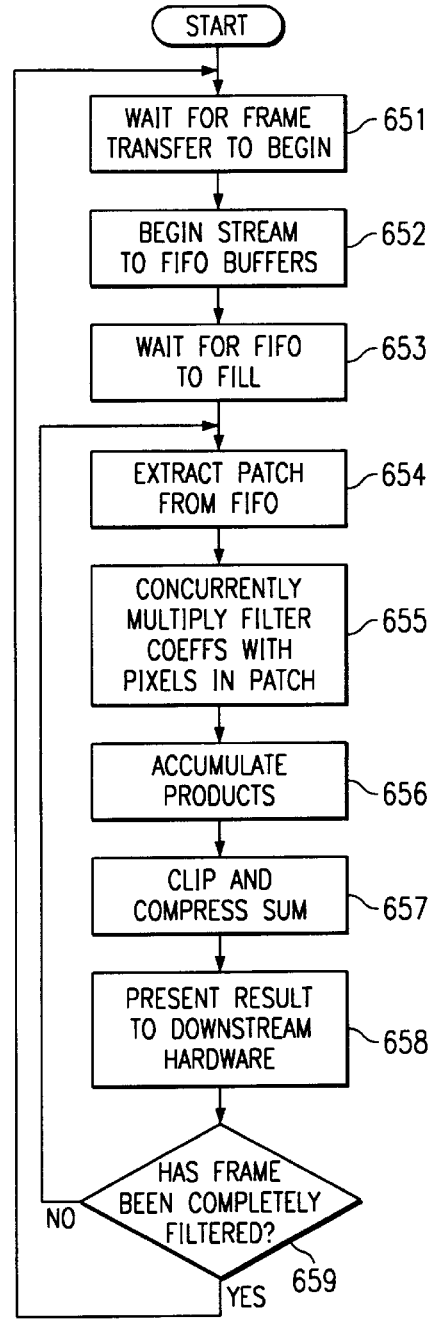
FIG. 6B is a flow chart describing low-latency "streaming" filtration according to the present invention.

The advantages of this architecture can be seen with reference to the flow charts depicted on FIGS. 6A and 6B. Turning first to FIG. 6A, prior art spatial filtration typically waits for the transfer of a new frame (block 601) and then transfers the entire frame's worth of information to a first memory region (block 602). When stored, the filter then takes the first patch of pixels (block 603) and makes sequential calculations based on the values of the filter's coefficients (block 604). In the exemplary case of the 4×4 filter array applied to the 8×8 input array as shown on FIG. 2A, block 604 on FIG. 6A would require 16 successive calculations.

Continuing on FIG. 6A, once all the calculations for a patch are complete, a prior art spatial filter next typically accumulates the products (block 605), clips and compresses the accumulated result (block 606) and then stores the accumulated result (for that patch) in a second memory region (block 607).

Filtration then returns to get the next patch of pixels (block 609) if block 608 determines that there are still more patches to process. If the frame is complete, however, the results as stored in the second memory are then presented to downstream hardware (block 610) and the filter waits for the transfer of the next frame to begin.

With continuing reference to FIG. 6A as described above, it will be seen that at least two events are on a critical path that may cause latency in processing. First, in block 602, an entire frame's worth of pixel information must be stored in a first memory before calculation against coefficients can begin. Second, calculations are typically done sequentially in block 604. Note also the hardware requirement for two dedicated memory regions in FIG. 6A.

Compare this now to a "streaming" processing of spatial filter coefficients as set forth on FIG. 6B. In block 651, the filter waits for frame transfer to begin. With momentary reference to FIG. 4, however, a preferred embodiment of the present invention receives pixel information into FIFO buffers 404. Returning to FIG. 6B, therefore, block 652 "opens the valve" of FIFO buffers to receive pixel information "on the fly." When the FIFO buffers are full (block 653), they then present a "patch" of pixels (block 654) simultaneously to calculation modules advantageously coupled together as shown on FIG. 4. All coefficient multiplications can then be made simultaneously (block 655 on FIG. 6A), the products accumulated into a result (block 656), the result clipped and compressed (block 657) and then presented to downstream hardware (block 658), all part of continuous filtered stream. Filtration then returns in block 659 to get the next patch of pixels from FIFO if processing of the current frame is not yet complete, or alternatively to wait for transfer of the next frame if processing of the current frame is complete.

The advantages of "streaming" processing according to FIG. 6B are now apparent. A frame of image information is processed in a stream using FIFO buffers (instead of the filter waiting for a frame of information to be stored in a first memory region in block 602 of FIG. 6A). For each patch, all calculations in FIG. 6B are performed simultaneously (instead of sequentially in block 604 of FIG. 6B). The filter of FIG. 6B uses FIFO buffers as a storage resource, instead of two separate regions of dedicated memory, as required by the filter of FIG. 6A. Hardware embodying FIG. 6B thus requires substantially less storage capability than hardware embodying FIG. 6A. In fact, FIG. 6B may be conveniently embodied on a unitary integrated circuit chip.

Although the present invention and its advantages have been described in detail, it should be understood that various changes, substitutions and alterations can be made herein without departing from the spirit and scope of the invention as defined by the appended claims.

I claim:

1. Computer architecture for performing low-latency spatial filtration of a pixelated input image represented as an input array of input pixel values, said input array filtered through a filter array of filtration coefficients wherein the filter array is not greater in any dimension than the input array and is smaller than the input array in at least one dimension, the architecture comprising:

a plurality of coefficient calculation modules, each coefficient in the filter array having a unique one of the calculation modules matched thereto, each calculation module including means for storing the coefficient matched thereto;

the plurality of calculation modules further disposed to operate concurrently;

the plurality of calculation modules responsive to an input signal, wherein the input signal comprises input pixel values organized into a series of preselected patches thereof, each of the patches being the input pixel values covered by the filter array when the filter array is overlaid at a different one of all possible locations on the input array, each patch indexed to an output value in an output array, the output array describing filtration of the input array by the filter array, each input pixel value in each patch further tagged to a corresponding coefficient appearing thereabove when the filter array is overlaid thereon;

means for delivering the input pixel values patch by patch to the plurality of calculation modules, wherein, as each patch is delivered, each input pixel value therein arrives substantially simultaneously at the calculation module matched to its tagged coefficient;

each calculation module further including a multiplier for multiplying the coefficient stored therein by corresponding tagged input pixel values as they arrive; and an accumulator responsive to the multipliers in all calculation modules, wherein the accumulator sums, patch by patch, all of the calculation modules' products of the coefficients multiplied by corresponding tagged input pixel values, the accumulator's sum of all of said products for a selected patch being the output value for said selected patch.

2. The architecture of claim 1, in which the means for storing is programmable.

3. The architecture of claim 1, in which each calculation module further includes a flip-flop gate for regulating arrival of input pixel values and delivery thereof to the multiplier.

4. The architecture of claim 1, in which the means for delivering includes FIFO storage for coordinating delivery of input pixel values to calculation modules in sequential patches thereof.

5. The architecture of claim 1, further comprising:

means for transforming output values into an output signal representing a stream thereof; and means for clipping and compressing the output signal prior to presentation thereof to downstream hardware.

6. The architecture of claim 1, in which said architecture is deployed on a unitary integrated circuit chip.

7. The architecture of claim 6, in which the chip is a CMOS chip.

8. Deployed on a unitary CMOS chip, computer architecture for performing low-latency spatial filtration of a pixelated input image represented as an input array of input pixel values, said input array filtered through a filter array of filtration coefficients wherein the filter array is not greater in any dimension than the input array and is smaller than the input array in at least one dimension, the architecture comprising:

a plurality of coefficient calculation modules, each coefficient in the filter array having a unique one of the calculation modules matched thereto, each calculation module including means for storing the coefficient matched thereto, the means for storing further programmable;

the plurality of calculation modules further disposed to operate concurrently;

the plurality of calculation modules responsive to an input signal, wherein the input signal comprises input pixel values organized into a series of preselected patches thereof, each of the patches being the input pixel values covered by the filter array when the filter array is overlaid at a different one of all possible locations on the input array, each patch indexed to an output value in an output array, the output array describing filtration of the input array by the filter array, each input pixel value in each patch further tagged to a corresponding coefficient appearing thereabove when the filter array is overlaid thereon;

means for delivering the input pixel values patch by patch to the plurality of calculation modules, wherein, as each patch is delivered, each input pixel value therein arrives substantially simultaneously at the calculation module matched to its tagged coefficient, the means for delivering further including FIFO storage for coordinating delivery of input pixel values to calculation modules in sequential patches thereof;

each calculation module further including a multiplier for multiplying the coefficient stored therein by corresponding tagged input pixel values as they arrive;

an accumulator responsive to the multipliers in all calculation modules, wherein the accumulator sums, patch by patch, all of the calculation modules' products of the coefficients multiplied by corresponding tagged input pixel values, the accumulator's sum of all of said products for a selected patch being the output value for said selected patch;

means for transforming output values into an output signal representing a stream thereof; and means for clipping and compressing the output signal prior to presentation thereof to downstream hardware.

9. A low-latency method for spatially filtering a pixelated input image represented as an input array of input pixel values through a filter array of filtration coefficients, wherein the filter array is not greater in any dimension than the input array and is smaller than the input array in at least one dimension, the method comprising the steps of:

(a) matching a plurality of coefficient calculation modules to a unique one of the filtration coefficients, each calculation module including means for storing the coefficient matched thereto;

(b) disposing the plurality of calculation modules to operate concurrently responsive to an input signal;

(c) organizing the input signal into a series of preselected patches of input pixel values, each of the patches being the input pixel values covered by the filter array when the filter array is overlaid at a different one of all possible locations on the input array;

(d) indexing each patch to an output value in an output array, the output array describing filtration of the input array by the filter array;

(e) tagging each input pixel value in each patch to a corresponding coefficient appearing thereabove when the filter array is overlaid thereon;

(f) delivering the input pixel values patch by patch to the plurality of calculation modules, wherein, as each patch is delivered, each input pixel value therein arrives substantially simultaneously at the calculation module matched to its tagged coefficient;

(h) at each calculation module, multiplying the coefficient stored therein by corresponding tagged input pixel values as they arrive; and (i) responsive to step (h), summing patch by patch all of the calculation modules' products of the coefficients multiplied by corresponding tagged input pixel values, the sum of all of said products for a selected patch being the output value for said selected patch.

10. The method of claim 9, in which selected steps of said method are performed by a digital signal processor deployed on a unitary integrated circuit chip.

11. The method of claim 9, in which step (a) includes the substep of programming coefficients into calculation modules to which said coefficients are to be matched in step (a).

12. The method of claim 9, further comprising the steps of:

(j) transforming output values into an output signal representing a stream thereof; and (k) clipping and compressing the output signal prior to presentation thereof to downstream hardware.

* * * * *